Aug. 16, 1938. W. P. ZIMMERMAN ET AL 2,127,150
METHOD OF FORMING HOLLOW GLASS ARTICLES
Filed Oct. 31, 1936
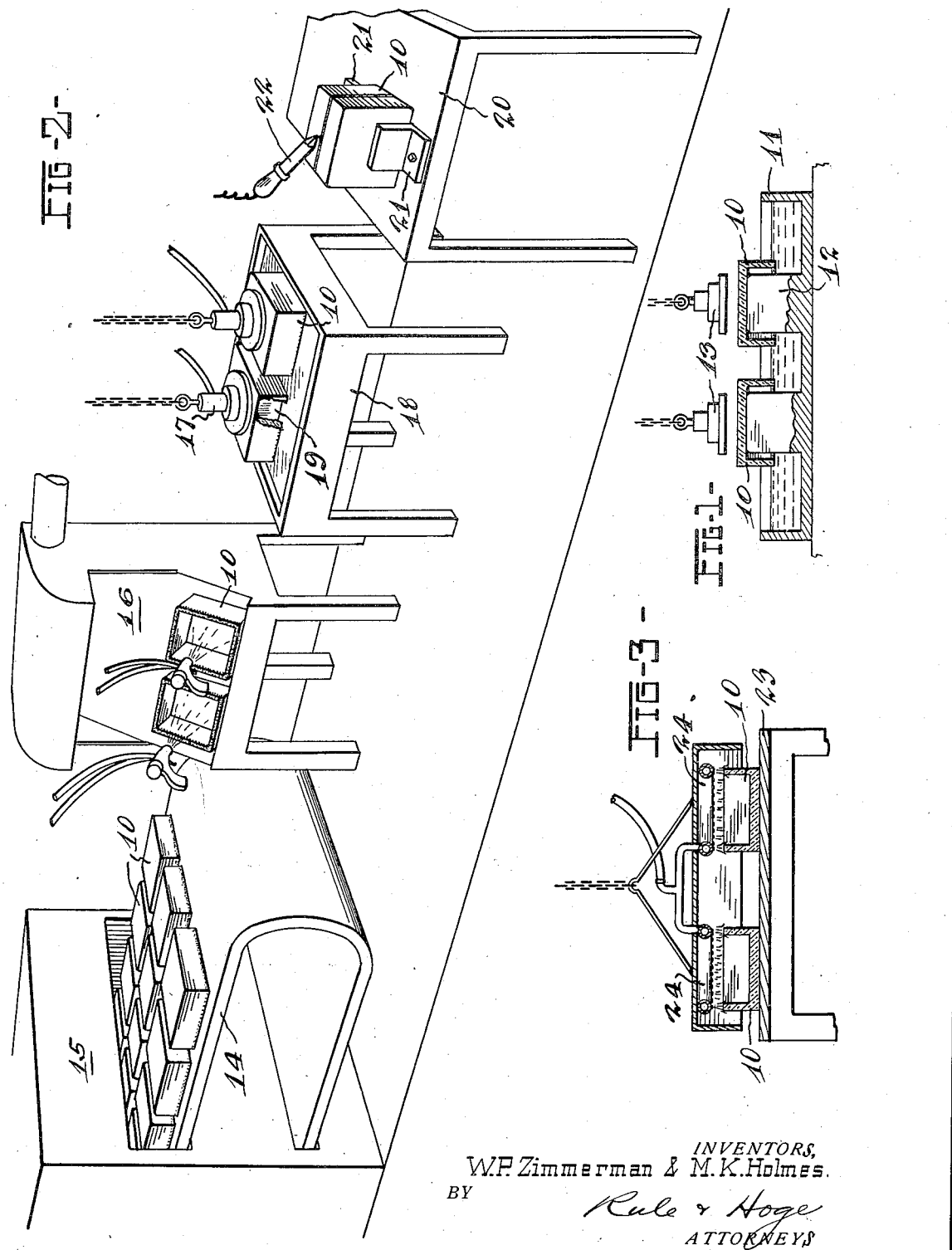
INVENTORS,
W.P. Zimmerman & M.K. Holmes.
BY
Rule & Hoge
ATTORNEYS Patented Aug. 16, 1938

2,127,150

UNITED STATES PATENT OFFICE 2,127,150

METHOD OF FORMING HOLLOW GLASS ARTICLES

Willard P. Zimmerman and Minot K. Holmes, Muncie, Ind., assignors to Owens-Illinois Glass Company, a corporation of Ohio Application October 31, 1936, Serial No. 108,530

6 Claims. (Cl. 49—82)

The present invention relates to a process of manufacturing hollow glass articles and more particularly to a method of joining together the edge portions of preformed sections of hollow glass building blocks.

The principal object of the invention is to provide a novel and effective means for uniting glass parts in a fashion capable of commercial adaptation.

Another object of the invention is to provide such a method which in the carrying out thereof will permit the glass parts undergoing assembly to be decorated in a suitable manner, as, for example, by a sand blasting operation, by etching, or otherwise decorating the interior or exterior surfaces thereof prior to the final assembly of the same.

A still further object of the invention is to provide a method of joining together the edge portions of preformed hollow glass parts which includes the step of reheating the edge portions to be joined together to prepare them for joining and in which provision is made for protecting the edge portions from the attendant danger of chipping or cracking.

The apparatus for carrying out the method involved is disclosed in the accompanying drawing in which:

Fig. 1 is a fragmentary vertical sectional view taken through an operating table and illustrating diagrammatically the initial step in the method of joining together the edge portions of a pair of preformed half-sections of a hollow glass building block;

Fig. 2 is a perspective view of an apparatus by means of which the remaining steps involved therein are carried out; and Fig. 3 is a fragmentary vertical sectional view taken through an operating table and heating apparatus employed in connection with a modified method of carrying out the principles of the invention.

While the present method is capable of use in joining together the edges of preformed sections of various forms of hollow glass articles, the invention is described in connection with the joining together of preformed half-sections of hollow hermetically sealed glass building blocks. The half-sections 10 are taken from the molds of a forming machine (not shown) in the usual manner, preferably in pairs, and the edges thereof are immediately, while still hot from the forming operation, dipped into a bath of molten aluminum or aluminum alloy contained in a trough 11 including supports 12 upon which the block sections rest with their edge portions projecting into the molten metal. The immersed surfaces of the half-sections, which include not only the extreme edges thereof but also a portion of the inner and outer sides extending upwardly therefrom, are allowed to remain in the bath a sufficient length of time to become heated to approximately the temperature of the metal and to effect adhesion of some of the metal to these sealing surfaces.

The coated edges of the two half-sections are removed from the molten aluminum bath, and, by means of suitable handling devices 13, the sections are placed on the conveyor 14 of an annealing leer 15 and are annealed in the conventional manner.

The annealed half-sections 10, the edges of which have been coated with metal, are removed from the leer 15 at substantially atmospheric temperature and at this stage in the process, they may, if desired, be decorated in any suitable manner, as, for example, by sand blasting or by an etching process.

If the interior surfaces of the sections 10 are to be decorated by a sand blasting operation, the sections are placed in a sand blasting apparatus 16 in such a manner that access may be had to the interior surfaces thereof and, after the decorating operation has been performed thereon, the sections are ready for the final assembly operation which includes a reheating of the edges thereof to be joined together.

Accordingly, the sections are, by means of handling devices 17 similar to the handling devices 13, suspended above a bath of molten aluminum or aluminum alloy contained in a trough 18 similar to the trough 11 and having supports 19 similar to the supports 12 associated therewith. The previously coated edges of the sections are thus gradually brought to the temperature of the molten aluminum preparatory to joining the edges together. The coating of aluminum which has previously been applied to the edges of the sections 10 prevents sudden contact of the comparatively cold glass edges with the hot molten metal and materially aids in the elimination of cracking or chipping of these edges.

The reheated coated edges of the two half-sections are removed from the molten aluminum bath and, by means of the handling devices 17, are juxtapositioned on an assembly table 20 in such a manner that the reheated and coated edges of each section oppose each other. By means of clamping devices 21 the adjacent treated edges are contacted under pressure to effect permanent adhesion of the same and consequent permanent joining together of the two half-sections of the block.

Excess bonding material is removed from the side surfaces of the block by means of a properly heated soldering iron 22 or other implement, the seam that results from the joining operation is smoothed, and any voids that may be present in the material are filled in and closed.

As an alternative method of preparing the previously coated edges of the half-sections 10 after the decorating operation has been performed, preparatory to the assembly operation, the two half-sections may be placed on a work table 23 in the manner shown in Fig. 3 and heat may be applied to the edges of the sections by means of a set of burners 24. In this manner the edges of the sections may be brought to, or nearly to, the temperature of the molten aluminum bath. In this manner there is still less likelihood that the edges of the half-sections will become chipped in the final reheating operation when they are dipped into the bath of molten metal.

Another departure from the method previously described may be effected by transferring the half-sections 10 directly from the table 23 to the assembly table 20 where the reheated edges that have previously been coated prior to the annealing operation may be joined together under pressure.

It is also within the spirit of the invention to omit either or both of the metallizing operations entirely. Thus, the half-sections may be treated in the annealing leer directly as they issue from the forming machine and, after the annealing operation, when cool, the decorating operation may be performed. Subsequently the edges of the half-sections may either be reheated on the table 23 by the burners 24 and a glass to glass union between these edges may be performed on the table 20, or they may be metallized in the molten aluminum bath contained in the trough 24 and the joining operation carried out as previously described.

In order to satisfy certain conditions of use, it may be desirable to give added decorative effects to the glass block undergoing manufacture. Similarly, it may be found desirable to change the physical characteristics thereof. For example, by placing certain substances such as colored glass or glass wool in the block prior to the final assembly operation, the light transmission or diffusion properties, or the insulating properties of the block may be altered. Any of the above described methods of manufacture lend themselves readily to such a procedure. Substances which would ordinarily be destroyed by the high temperatures involved in the annealing operation may be placed in the block while the sections of the block are in juxtaposition on the assembly table 30 and be sealed in the block when the edges of the half-sections are joined together.

Modifications may be resorted to within the spirit and scope of the appended claims.

We claim:

1. The method of manufacturing a hollow glass article which comprises forming sections of the article in a mold, utilizing the residual heat from the forming operation to effect a union between the edges of the sections to be joined and a molten metal whereby said edges become coated with said metal, annealing said sections and allowing the same to cool, reheating said coated edges to remelt the metal thereof, contacting the reheated and coated edges, and allowing the same to cool whereby the metal thereof becomes solidified and united.

2. The method of manufacturing a decorative hollow glass article which comprises forming sections of the article in a mold, utilizing the residual heat from the forming operation to effect a union between the edges of the sections to be joined and a molten metal whereby said edges become coated with said metal, annealing said sections and allowing the same to cool to permit decoration of the interior of one or more of said sections, applying a flame to said coated edges to reheat the same beyond the melting point of the metal thereof, contacting the reheated and coated edges, and allowing the same to cool whereby the metal thereof becomes solidified and united.

3. The method of manufacturing a decorative hollow glass article which comprises forming sections of the article in a mold, utilizing the residual heat from the forming operation to effect a union between the edges of the sections to be joined and a molten metal whereby said edges become coated with said metal, annealing said sections and allowing the same to cool to permit decoration of the interior of one or more of said sections, submerging said coated edges of the decorated sections in a bath of molten metal to reheat the same, contacting the reheated and coated edges, and allowing the same to cool whereby the metal thereof becomes united and solidified.

4. The method of manufacturing a decorative hollow glass article which comprises forming sections of the article in a mold, utilizing the residual heat from the forming operation to effect a union between the edges of the sections to be joined and a molten metal whereby said edges become coated with said metal, annealing said sections and allowing the same to cool to permit decoration of the interior of one or more of said sections, applying a flame to said coated edges to reheat the same, submerging said reheated edges in a bath of molten metal to further reheat the same, contacting said coated edges, and allowing the same to cool whereby the metal thereof becomes solidified and united.

5. The method of manufacturing a hollow glass article which comprises forming sections of the article in a mold, utilizing the residual heat from the forming operation to effect a union between the edges of the sections to be joined and a molten metal whereby said edges become coated with said metal, annealing said sections and allowing the same to cool, applying a flame to said coated edges to reheat the same, submerging said reheated edges in a bath of molten metal to further reheat the same, contacting said coated edges, and allowing the same to cool whereby the metal of said edges becomes solidified and united.

6. The method of manufacturing a decorative hollow glass article which comprises forming sections of the article in a mold, annealing said sections and allowing the same to cool to permit decoration of the interior of one or more of said sections, applying a flame to said edges to reheat the same, submerging said reheated edges of the decorated sections in a bath of molten metal to effect a union between said edges and said metal and to effect adhesion of some of the metal thereto, contacting the reheated and coated edges, and allowing the same to cool whereby the metal adhering to said edges becomes solidified and united.

WILLARD P. ZIMMERMAN.
MINOT K. HOLMES.